Nov. 16, 1937.  C. A. OVERTURF  2,099,642
TIRE DEFLATING DEVICE
Filed June 24, 1936
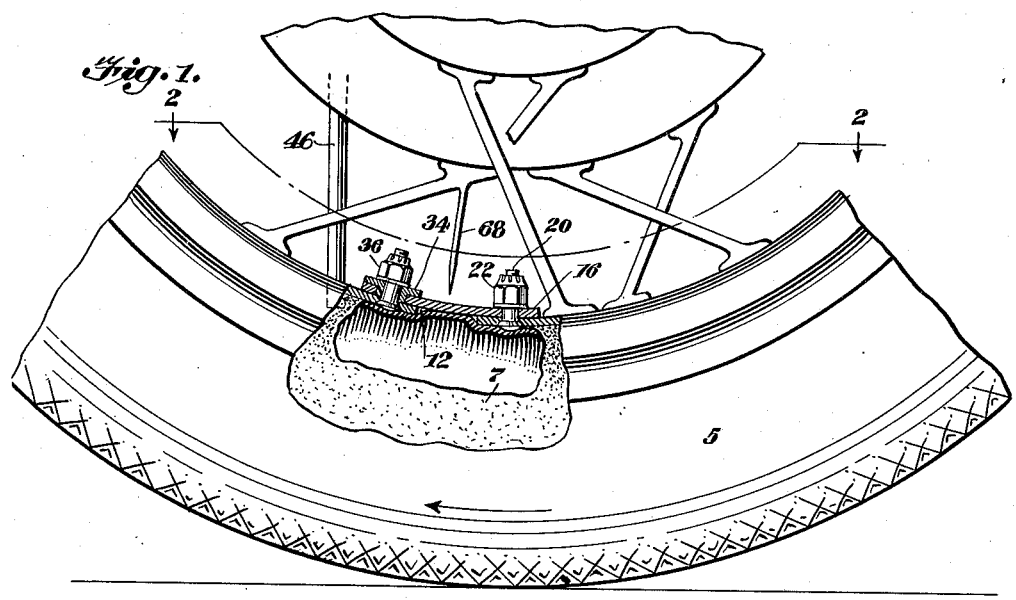
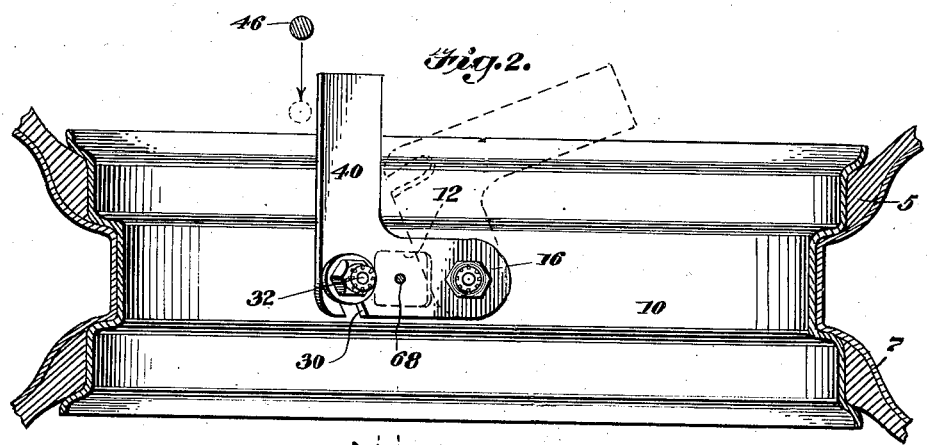
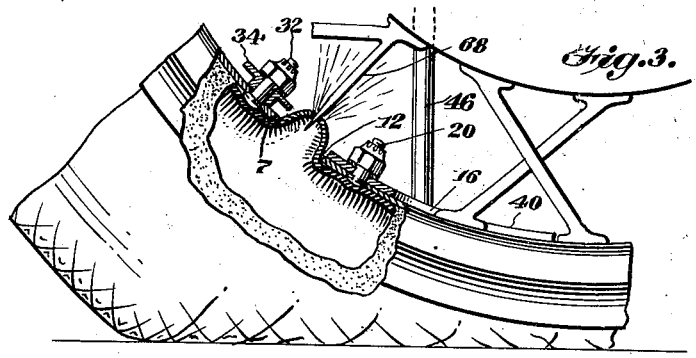
Inventor
CLARENCE A. OVERTURF
BY E. F. Salter
Attorney Patented Nov. 16, 1937

2,099,642

UNITED STATES PATENT OFFICE 2,099,642

TIRE DEFLATING DEVICE

Clarence A. Overturf, Detroit, Mich., assignor to American Tire Guard Company, Detroit, Mich., a corporation of Michigan Application June 24, 1936, Serial No. 87,077

9 Claims. (Cl. 35—49)

This invention relates to a means providing for the sudden deflation of automobile tires so as to produce the effect of a blow-out.

The invention is especially intended for use in connection with experimental and demonstration work being carried on by those who manufacture automobiles and/or parts therefor and looks to a simple, quick and positive means by which a tire may be deflated while running and with the suddenness that goes with the usual blow-out and without damage to the tire casing.

In all previous intentional blow-out devices of which I know, the operation of the same damages the tire to a point where, in many cases, the tire is unfit for further use. For example, some tires are intentionally blown by the explosion of a dynamite cap inside the tire. Other tires are blown by the discharge of a gun secured to the fender while in other cases a knife is so mounted that at the desired moment, it is plunged into the tire and, of course, the practice of each of these methods results in the destruction of the tire casing as well as the inner tube.

By way of brief preliminary reference to the invention, it might be pointed out that the same contemplates the confinement of the inflated tube in a way that allows of the sudden and certain release of a restricted portion of the inner tube while the associated vehicle is in motion so that the superior pressure of the air within the tube will explode or break through the released portion of the tube; or a puncturing element may be employed alone or in concert with such pressure to effect the required sudden penetration of the tube from which it will be seen that the effect of the blow-out is achieved without damage to the tire so that the tire may be used repeatedly for blow-out experiments and demonstrations.

Also, the invention provides a tire tube exploding device which is of highly simplified construction, one which may be applied without special regard for the size or type of wheel or rim, and one which may be brought into play at any desired moment and from a convenient point within the vehicle.

Other objects and advantages will be apparent during the course of the following description.

In the accompanying drawing, forming a part of this application and in which like numerals are employed to designate like parts throughout the same, Figure 1 is a fragmentary side elevation, partly in section, of a vehicle wheel equipped with the invention, with the parts in the positions occupied prior to the intentional deflation of the tire, Figure 2 is a detail sectional view taken on line 2—2 of Figure 1, Figure 3 is a view similar to Figure 1 with the parts in the positions occupied after the sudden deflation of the tire.

In the drawing, wherein for the purpose of illustration is shown a preferred embodiment of the invention, the numeral 5 designates the casing of a pneumatic tire while the numeral 7 designates an inner tube of rubber or some other elastic material and which is, of course, imperforate for the reception of air under pressure.

It is illustrated in Figure 2 that the tire casing 5 and the tube 7 are mounted on a drop-center rim 10 although, as will appear, the invention is in no manner restricted to use in connection with a drop-center rim.

By special reference to Figures 1 and 3, it will be seen that the rim 10 is provided at a point approximately midway of the side flanges thereof with a rectangular or other opening 12 for the passage of the adjacent elastic portion of the inner tube 7. Now, in Figure 2 it is illustrated that a closure plate or member 16 is movably extended across the opening 12 to occupy a position in restraining relation to the adjacent elastic portion of the inner tube which leads to the statement that with the plate or closure 16 extended across the opening 12, the adjacent elastic portion of the inner tube is confined to the position shown in Figure 1.

In the disclosed form of the invention, one terminal portion of the closure 16 is pivotally attached to the rim with the aid of a pivot bolt 20. A nut 22 is threaded on the bolt 20 and may be adjusted to place the required or desired pressure on the closure. In this way, the ease with which the closure may be operated may be regulated.

In addition, the closure 16, which is in the nature of an elongated plate, is provided at the end removed from the pivot element 20 with a slot or notch 30 for the reception of a restraining bolt 32 and the associated bushing or spacer 34. It is shown in Figure 1 that a portion of the bushing 34 is of a diameter to fit within the slot or notch 30 while the remaining portion of the bushing has a vastly greater diameter and extends over the adjacent portion of the closure plate 16. The presence of the bushing 34, fashioned as it is, prevents the nut 36 on the bolt 32 from being tightened to the point where the closure 16 may not be easily released. Clearly, the pressure of the air within the tube exerts a constant pressure against the closure and forces the closure against the element 34 with a firmness that holds the closure against accidental release.

It is best illustrated in Figure 2 that the slotted portion of the closure 16 is provided with a laterally projecting arm or trigger 40. This trigger projects beyond the adjacent flange of the rim and, of course, revolves with the rim. The fact that the trigger or arm 40 extends beyond the side of the rim allows the same to be conveniently engaged by an actuating device 46 in the nature of a bar or other contact means which may be operated from a point adjacent the driver's seat through a motion transmitting mechanism of any kind or which may be operated by hand. Since the exact mounting for the member 46 and the motion transmitting mechanism which may be used in connection therewith forms no part of the invention and may be easily produced by those skilled in the art, no detailed showing of this will be found in this application.

In use, the closure 16 is positioned in the tube confining position suggested in Figure 1 and when the tire has been inflated, the closure will remain undisturbed in its closed position until intentionally operated or swung to the tube releasing or exposing position. With the closure thus held in tube confining position, the vehicle of which the rim is a part may be used for ordinary transportation purposes and when the tire is to be suddenly deflated to produce the effect of a blowout for experimental or demonstration purposes, it is merely necessary to drive the car at the speed at which the demonstration or experiment is to be performed and then bring the actuating element 46 into play for moving the closure into tube releasing position. With the movement of the closure 16 to tube releasing position, the adjacent elastic portion of the inner tube is pushed through the opening 12 by the air within the tire and the tube is promptly ruptured which, of course, brings about the deflation of the tire with the suddenness accompanying a blow-out.

In addition, it is contemplated that a prong or penetrating element 68 may be employed alone or in concert with the pressure of the air within the tire to puncture the newly released expansible portion of the tube and in this way assure a definite blow-out. The penetrating element 68 is shown to be in the nature of a shank or needle mounted radially at a point inward of the rim and having its pointed end directed outward for engaging the tube but, of course, spaced inward from the tube when the parts are positioned as shown in Figure 1.

It is believed to be clear that the invention may be economically applied to various types of rims and to rims without regard to the size thereof and when applied will remain inconspicuously in place, ready for operation whenever it is desired to achieve the result of a blow-out for experimental, demonstration or other purposes.

As brought out in the opening paragraphs of the specification, in all previous blow-out devices of which I am aware, the operation of the same damages the tire, while in this invention the only part that is damaged as an incident to the actual deflation of the tire is the tube which may be easily repaired. Thus, the device may be used again and again in connection with the same tire casing and tube thereby avoiding the expense of a separate tire for each intentional blow-out.

Since the closure plate 16 is held in place, first, by the pressure of the air within the tube and, second, by the member 20 and immediately associated parts, premature operation of the device is prevented. On the other hand, the device may be brought into certain and positive play whenever and wherever desired or required. On numerous occasions, I have operated the device to produce the effect of a blow-out while traveling at such high speeds as sixty miles per hour and with no delay or uncertainty.

It is to be understood that the form of invention herewith shown and described is to be taken merely as a preferred example of the same and that such changes in arrangement and construction of parts may be made as will remain within the spirit of the invention and the scope of what is claimed.

Having thus described the invention, what is claimed is:

1. In a device for the intentional deflation of pneumatic tires while running, a rim for the support of a tire casing and an associated air containing elastic inner tube, said rim being provided with an opening for the passage of an elastic portion of the inner tube, and a movable closure extending over said opening to restrain the adjacent elastic portion of the inner tube and being movable out of restraining relation to the adjacent elastic portion of the inner tube to release the same.

2. In a device for the intentional deflation of pneumatic tires while running, a rim for the support of a tire casing and an associated air containing elastic inner tube, said rim being provided with an opening for the passage of an elastic portion of the inner tube, a movable closure extending over said opening to restrain the adjacent elastic portion of the inner tube and being movable out of restraining relation to the adjacent elastic portion of the inner tube to release the same, and a puncturing element for engaging the said adjacent elastic portion of the inner tube upon being released.

3. In a device for the intentional deflation of pneumatic tires while running, a rim for the support of a tire casing and an associated air containing elastic inner tube, said rim being provided with an opening for the passage of an elastic portion of the inner tube, a movable closure extending over said opening to restrain the adjacent elastic portion of the inner tube and being movable out of restraining relation to the adjacent elastic portion of the inner tube to release the same, a puncturing element for engaging the said adjacent elastic portion of the inner tube upon being released, and a pivotal mounting for said closure.

4. In a device for the intentional deflation of pneumatic tires while running, a rim for the support of a tire casing and an associated air containing elastic inner tube, said rim being provided with an opening for the passage of an elastic portion of the inner tube, and a movable closure extending over said opening to restrain the adjacent elastic portion of the inner tube and being movable out of restraining relation to the adjacent elastic portion of the inner tube to release the same, said closure being provided with means for engagement by an actuating element.

5. In a device for the intentional deflation of pneumatic tires while running, a rim for the support of a tire casing and an associated air containing elastic inner tube, said rim being provided with an opening for the passage of an elastic portion of the inner tube, a movable closure extending over said opening to restrain the adjacent elastic portion of the inner tube and being movable out of restraining relation to the adjacent elastic portion of the inner tube to release the same, said closure being provided with means for engagement by an actuating element, a pivotal mounting for said closure, and means cooperating with said pivotal mounting to normally hold said closure in a position extending over said opening.

6. In a device for the intentional deflation of pneumatic tires while running, a rim for the support of the tire casing and an associated air containing elastic inner tube, said rim being provided with an opening between the sides thereof for the passage of an elastic portion of the inner tube, a movable closure plate extending across said opening to restrain the said adjacent elastic portion of the inner tube and being movable out of such restraining relation to the adjacent elastic portion of the inner tube to release the same, said closure being provided with a laterally projecting arm terminating beyond one side of the rim, and means to engage said arm to actuate the same and said closure.

7. In a device for the intentional deflation of pneumatic tires while running, a rim for the support of the tire casing and an associated air containing elastic inner tube, said rim being provided with an opening between the sides thereof for the passage of an elastic portion of the inner tube, a movable closure plate extending across said opening to restrain the said adjacent elastic portion of the inner tube and being movable out of such restraining relation to the adjacent elastic portion of the inner tube to release the same, said closure being provided with a laterally projecting arm terminating beyond one side of the rim, means to engage said arm to actuate the same and said closure, and a pivotal mounting for said closure plate.

8. In a device for the intentional deflation of pneumatic tires while running, a rim for the support of the tire casing and an associated air containing elastic inner tube, said rim being provided with an opening between the sides thereof for the passage of an elastic portion of the inner tube, a movable closure plate extending across said opening to restrain the said adjacent elastic portion of the inner tube and being movable out of such restraining relation to the adjacent elastic portion of the inner tube to release the same, said closure plate being provided with a laterally projecting arm terminating beyond one side of the rim, means to engage said arm to actuate the same and said closure plate, a pivotal mounting for said closure plate, and means located adjacent one terminal of said arm and coacting with said pivotal mounting in securing said closure plate in place.

9. In a device for the intentional deflation of pneumatic tires while running, a rim for the support of the tire casing and an associated air containing elastic inner tube, said rim being provided with an opening between the sides thereof for the passage of an elastic portion of the inner tube, a movable closure plate extending across said opening to restrain the said adjacent elastic portion of the inner tube and being movable out of such restraining relation to the adjacent elastic portion of the inner tube to release the same, said closure plate being provided with a laterally projecting arm terminating beyond one side of the rim, means to engage said arm to actuate the same and said closure, and a penetrating element to puncture the newly released portion of the inner tube.

CLARENCE A. OVERTURF.